US011029906B2

(12) United States Patent
Anderson et al.

(10) Patent No.: US 11,029,906 B2
(45) Date of Patent: Jun. 8, 2021

(54) CONTENT MANAGEMENT ACROSS OVERLAPPING DISPLAYS

(71) Applicant: Intel Corporation, Santa Clara, CA (US)

(72) Inventors: Glen J. Anderson, Beaverton, OR (US); Aleksander Magi, Portland, OR (US); Gustavo Fricke, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/231,128

(22) Filed: Dec. 21, 2018

(65) Prior Publication Data

US 2019/0121595 A1   Apr. 25, 2019

(51) Int. Cl.
| | |
|---|---|
| *G06F 3/14* | (2006.01) |
| *G09G 5/38* | (2006.01) |
| *G09G 5/373* | (2006.01) |
| *G06F 21/44* | (2013.01) |

(52) U.S. Cl.
CPC .......... *G06F 3/1423* (2013.01); *G06F 3/1462* (2013.01); *G06F 21/44* (2013.01); *G09G 5/373* (2013.01); *G09G 5/38* (2013.01); *G09G 2300/023* (2013.01); *G09G 2320/066* (2013.01); *G09G 2320/0613* (2013.01); *G09G 2320/0626* (2013.01); *G09G 2320/0666* (2013.01); *G09G 2320/0673* (2013.01); *G09G 2340/06* (2013.01); *G09G 2340/14* (2013.01); *G09G 2356/00* (2013.01); *G09G 2370/022* (2013.01); *G09G 2370/042* (2013.01); *G09G 2370/16* (2013.01)

(58) Field of Classification Search
CPC ............................ G06F 3/1423; G06F 3/1462
USPC ......................................................... 345/589
See application file for complete search history.

(56) References Cited

U.S. PATENT DOCUMENTS

| | | | |
|---|---|---|---|
| 9,704,003 B1 | 7/2017 | Anderson et al. | |
| 2007/0273609 A1* | 11/2007 | Yamaguchi | G06F 3/1423 345/1.1 |
| 2010/0039350 A1 | 2/2010 | Wakefield et al. | |
| 2010/0060547 A1 | 3/2010 | Bloebaum et al. | |
| 2014/0245194 A1* | 8/2014 | Wright | G06F 3/01 715/761 |

(Continued)

OTHER PUBLICATIONS

Martin Spindler, "Spatially Aware Tangible Display Interaction in a Tabletop Environment", Nov. 2012, 6 pages.

(Continued)

*Primary Examiner* — Shivang I Patel
(74) *Attorney, Agent, or Firm* — Schwabe, Williamson & Wyatt, P.C.

(57) ABSTRACT

Apparatuses and methods for managing display content across overlapping devices are disclosed. A display connected to or part of a first device may be at least partially occluded by a second device. In the disclosed embodiments, the first device detects the position and orientation of the second device relative to the display, determines a portion of the display that is occluded by the second device, and manages the content of the display and/or a display connected to the second device to accommodate the occluded portion. In some embodiments, the content is managed with respect to the context of the content displayed on the displays connected to the first and second devices.

24 Claims, 7 Drawing Sheets

(56) References Cited

U.S. PATENT DOCUMENTS

2015/0161937 A1    6/2015  Locker et al.
2017/0192733 A1*  7/2017  Huang ................. G06F 3/1446

OTHER PUBLICATIONS

Rong-Hao Liang et al., "GaussBits: Magnetic Tangible Bits for Portable and Occlusion-Free Near-Surface-Interactions", Apr. 2013, 11 pages.
Nicolai Marquardt et al., "Cross-Device Interaction via Micromobility and F-formations", Oct. 2012, 10 pages.
Nicolai Marquardt et al., "The Proximity Toolkit: Prototyping Proxemic Interactions in Ubiquitous Computing Ecologies", 2011, 10 pages.
Hans-Christian Jetter et al., "Self-Organizing User Interfaces: Envisioning the Future of Ubicomp UIs", Apr. 27-May 2, 2013, 6 pages.
Y. Zhang et al., "A High-Sensitive Ultra-Thin MEMS Capacitive Pressure Sensor", 2011 IEEE, 4 pages.
Chang Min Kim et al., "G-raff: An Elevating Tangible Block of Spatial Tabletop Interaction", Apr. 18-23, 2015, 2 pages, Seoul, Korea.
Hamza Khalid, "mosaic.io Combines Multiple iPhones to Create One Big Display for Viewing Photos & Sharing Files", Apr. 3, 2013, 15 pages.
Darrell Etherington, "Mosaic Lets You Weave Display From Multiple iPhones and iPads, Offers SDK for Developers", 2013, 13 pages.
B. Shah et al., "Towards Enhanced Searching Architecture for Unstructured Peer-to-Peer Over Mobile Ad Hoc Networks [Abstract Only]", Jul. 2014, 9 pages, Wireless Personal Communications, vol. 77, Issue 2.

\* cited by examiner

CONTENT MANAGEMENT ACROSS OVERLAPPING DISPLAYS

TECHNICAL FIELD

Embodiments described herein generally relate to the field of computing. In particular, apparatuses, systems and computer-readable storage medium for coordinating and managing the displayed content of overlapping display devices are described.

BACKGROUND

Displays, including displays that are integrated with devices of a variety of sizes such as all-in-one computers, personal assistants, tablets, smart phones, and, increasingly, table-top surfaces, are available in a variety of sizes and configurations. Displays, particularly those integrated into a computing device, may further include one or more sensors disposed in, on, or about the display. Sensors may include touch panels, fingerprint sensors, pressure sensors, light sensors, cameras, proximity detectors, and any other sensor type that may offer useful input data that may be equipped to a panel without detrimentally affecting its performance.

DESCRIPTION OF EMBODIMENTS

Figure 5:
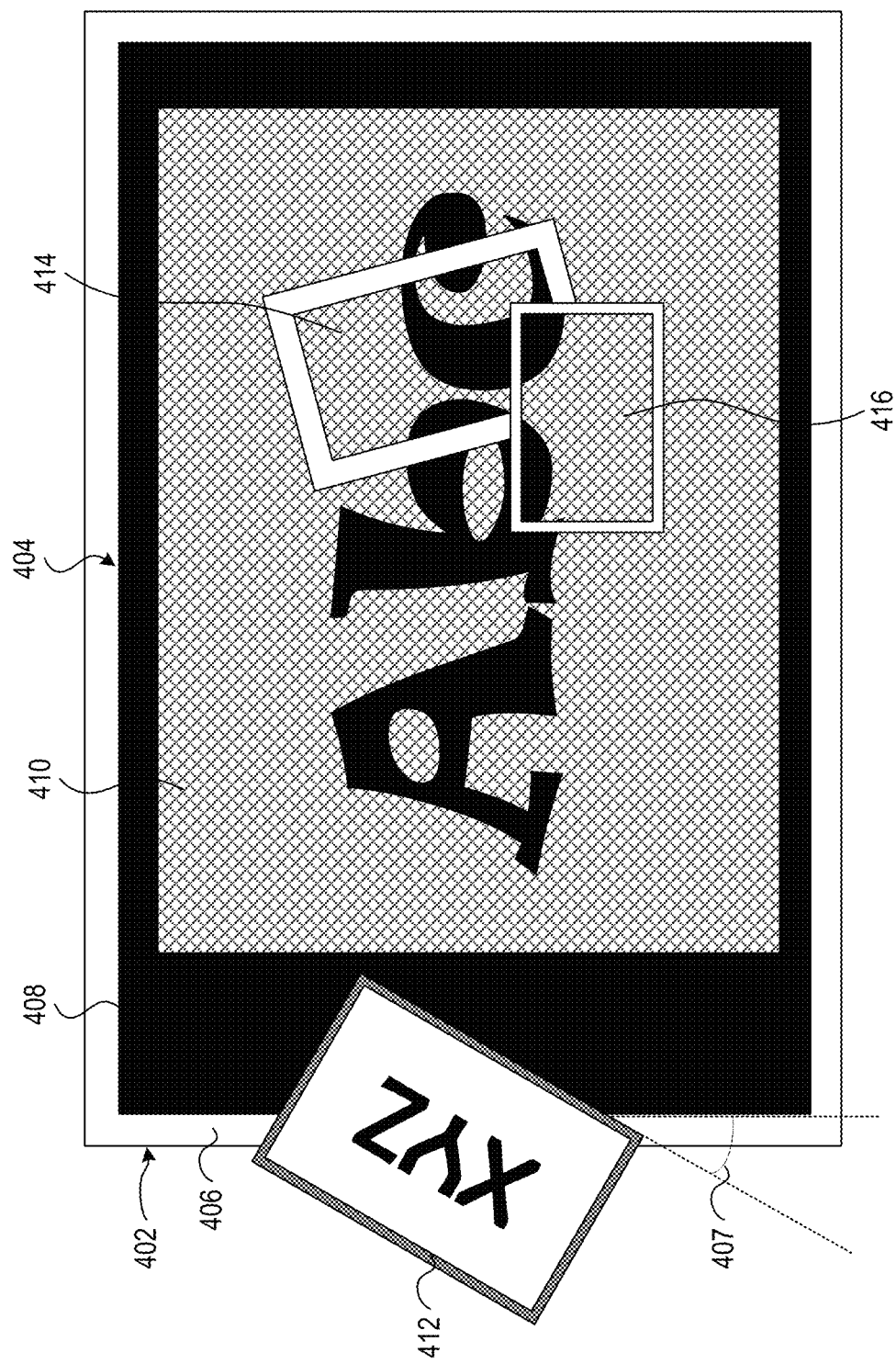
FIG. 5 is a diagram of multiple example devices that overlap in various configurations, depicting possible results of display management, according to various embodiments.

The growing prevalence of devices with displays of varying configurations, including large display surfaces such as table computers like Samsung's SUR40, increasingly presents the possibility of multiple devices being physically positioned in a partial or completely overlapping configuration. For example, users of a table computer may set various other devices, such as a tablet or smartphone, atop the table computer's display. In other examples, one or more personal devices may overlap, such as a smartphone overlapping a tablet, two tablets overlapping to some extent, or other arrangements of devices. FIG. 5 depicts several such possible arrangements, to be described more fully below.

When two or more devices overlap, particularly where each device includes a display that may contain content, it may be useful to coordinate the content displayed between each overlapping device. While existing solutions provide for extending content across displays placed adjacent to each other or duplicate content from one display to the next, e.g. screen mirroring or casting, such solutions do not account for or manage display overlap. Such solutions also fail to account for the context of display content to flexibly determine how to coordinate or manage content across the overlapping displays.

The disclosed embodiments include context-aware management of content displayed across devices with overlapping displays or screens. In one example, and as will be explained in greater detail herein, at least some of the content on a first device display that is at least partially occluded by a second device may be displayed on the second device's screen, effectively turning the second device into a window to the content of the first device. In another example, content on the first device may be moved or scaled to avoid the location of the second device.

In either example, the first and second devices, in some embodiments, are in communication with each other to coordinate and potentially transfer content. In some environments, one device may authenticate to the other. The actions taken between the two devices and coordination of content on each of the first and second devices' respective screens may depend upon the context of content on each screen, if any. Furthermore, while disclosed embodiments primarily focus on the interactions between two devices, the disclosed techniques may be extended to work with any arbitrary number of devices, as well as working with assistance of one or more other devices that are not part of the overlapping devices.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous. As used herein, the term "module" or "engine" refers to, is part of, or includes an Application Specific Integrated Circuit (ASIC), an electronic circuit, a processor (shared, dedicated, or group) and/or memory (shared, dedicated, or group) that executes one or more software or firmware programs, a combinational logic circuit, and/or other suitable components that provide the described functionalities.

Figure 1:
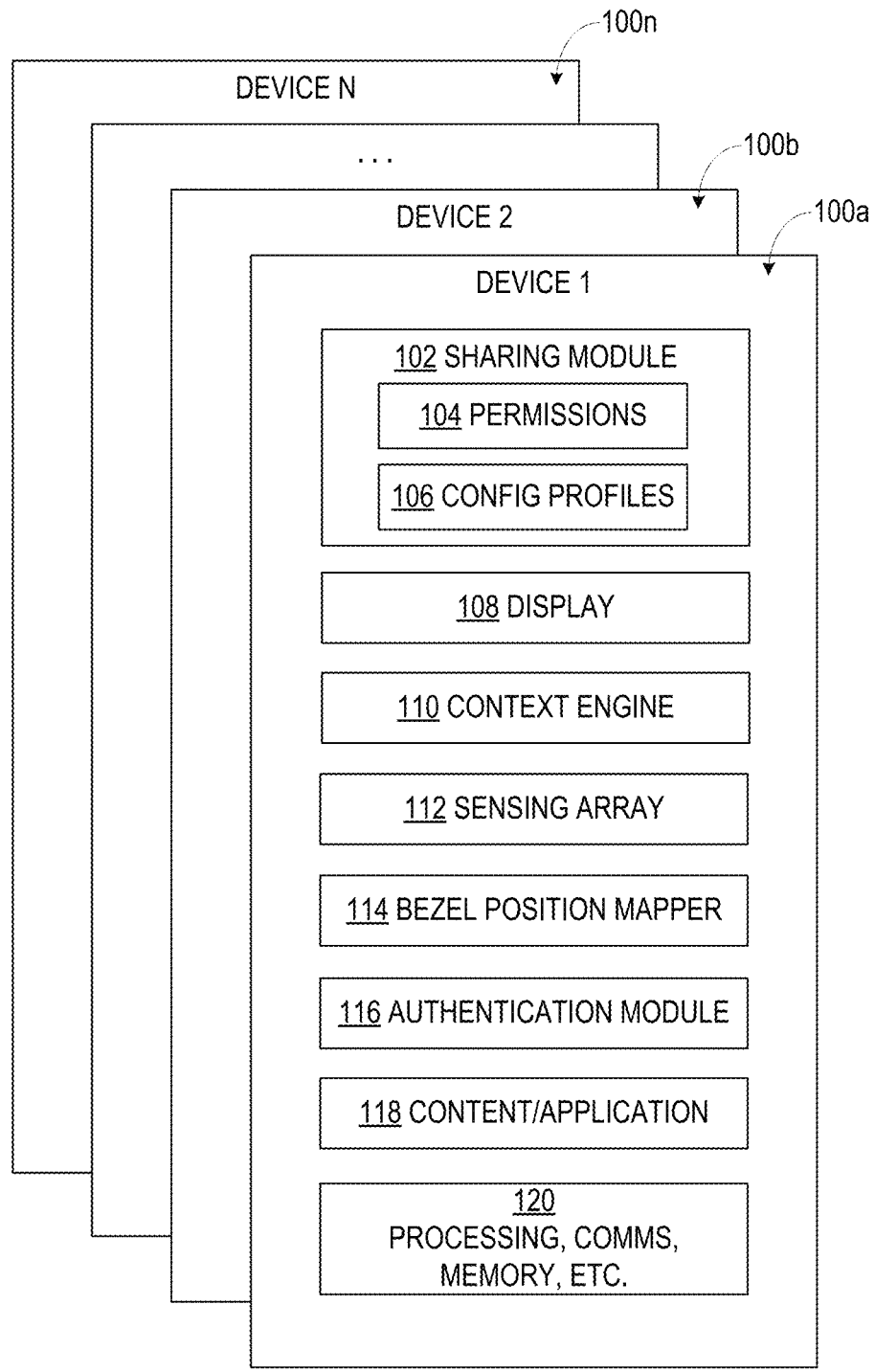
FIG. 1 is a diagram of possible blocks in an example device configured for management with overlapping displays, according to various embodiments.

FIG. 1 depicts devices 100a, 100b, to 100n (collectively, device 100), each of which includes one or more components needed to implement the disclosed methods, for the illustrated embodiments. In the depicted embodiments, a device 100 includes a sharing module 102, a display 108, a context engine 110, a sensing array 112, a bezel position mapper 114, an authentication module 116, one or more contents/applications 118, and various processing, communications, memory and similar support structures 120 (collectively, processor 120). Processor 120 may be implemented as one or more of the various components of a computer device 500, discussed herein with respect to FIG. 6. In some embodiments, device 100 includes at least a display 108 and processor 120 (including a communications module). In other embodiments, device 100 further includes a sensing array 112.

Device 100 may be implemented as any suitable computer device 500, described more fully below. Possible embodiments include smartphones, tablets, table computers, laptops, desktops, or any other suitable computing device. As detailed herein, a device 100a and device 100b may both implement aspects of the disclosed methods, and thus interact with each other, where device 100a may occlude at least a portion of device 100b (or vice-versa). Further, any arbitrary number of devices 100a-n may interact and manage content between each other. With a plurality of devices 100 implementing the disclosed methods, in one example the various devices 100 may determine or elect one specific device to coordinate content management across all devices. In another example, the bottom-most device (e.g. the device with a screen that is at least partially occluded by a second device, where there are two devices) may coordinate content management with all other devices stacked atop. In still another example, the various devices may negotiate collectively to manage content across all stacked devices.

Sharing module 102, in embodiments, is the logical or functional unit responsible for coordinating display of content on device 100a with other external devices 100b-n. Sharing module 102 communicates with external devices via processor 120 (particularly via a communications module that may be part of processor 120), and is in communication within device 100 with one or more of the various other components of device 100, such as display 108, context engine 110, sensing array 112 and/or bezel position mapper 114, authentication module 116, and content/application 118.

Sharing module 102, for the illustrated embodiments, further includes one or more permissions 104 for controlling access to device 100, which may be in connection or coordination with authentication module 116. Permissions 104 establish the level of access that other external devices interacting with device 100 have to manage content from device 100, including receiving and/or transmitting content between an occluded device and occluding device(s). For example, permissions 104 may be used to exclude some devices from interfacing with a device 100 to manage its display content. Alternatively or additionally, permissions 104 may be used to limit the types of content management permitted to device 100. In one possible embodiment, permissions 104 may permit external devices to scale or move existing content on device 100, but not allow the external devices to instruct device 100 to receive and display external content. In another embodiment, permissions 104 may allow external devices full access to manage content on a device 100. As may be understood, each device 100 may include its own set of permissions 104 that may differ from permissions 104 in other devices 100.

Sharing module 102, for the illustrated embodiments, further includes one or more configuration profiles 106, for management of or in coordination with content/applications 118. Configuration profiles 106, in embodiments, establish the rules by which devices 100a-n manage display content on each device with consideration given to the context of each device. Context, as used herein, includes any aspect of a device 100 that may be relevant to determining how display content should be manipulated. For example, context may include whether a device display is powered, whether the device is unlocked, whether the device is executing an application that requires access to the display, and the current content on the display, to name a few possible aspects. Context may be determined across multiple devices 100 that are interacting to manage content across the display of each respective device 100.

Some possible behaviors by devices 100 in occluding and occluded positions are as follows, in table 1:

TABLE 1

| Top screen | Occluded screen | Behavior |
| --- | --- | --- |
| Smart phone with screen off occluding greater than X square millimeters of occluded screen | Showing image | Smart phone to show virtual pass-through to occluded screen |
| Screen on, showing app | X or less square millimeters of occluded screen visible | Turn off occluded screen |
| Projected image on | Smart phone off | Turn occluded screen on with continuous content to match projection |
| Smart phone on with image 1 | Table top on with image 2 | Reduce size of occluded image to allow side-by-side comparison of images |

The foregoing configurations are possible configurations, and not intended to be limiting; additional or alternative configurations may be utilized depending upon the specifics of a given embodiment. As may be seen from table 1, the content on both an occluding, or top, display and an occluded display may be managed or otherwise coordinated in response to the top display or device occluding at least a portion of display or device upon which the top display or device is placed. The behaviors of each display may change depending upon the current conditions of each top and occluding display, which may make up at least part of the context of each device. Moreover, where there are multiple overlapping or occluding devices 100, in some embodiments each device 100 is associated with a unique ID (which may be obtained via authentication module 116, described herein), which allows sharing module 102 to determine which particular behavior should be configured to a given device 100, as well as designate different content for each device 100.

Although table 1 lists the screens as being part of a smartphone, it should be understood that any device and/or display may be employed with the example behaviors. These behaviors may be captured in configuration profiles 106, and will be discussed with reference to FIG. 5 below. Execution of these various behaviors on a given device 100, as discussed above, may be subject to limitations imposed by permissions 104. Depending on the permissions 104 stored in a given device 100, device 100 may not support one or more behaviors if directed by an external device. If a device 100 does not support various behaviors, this may be communicated to any device intending to manage the content of the device 100.

While FIG. 1 depicts sharing module 102 as including permissions 104 and configuration profiles 106, this is a logical association only. Depending on the needs of a particular implementation or embodiment, one or both of permissions 104 and configuration profiles 106 may be stored apart from sharing module 102. In some embodiments, one or both of permissions 104 and configuration profiles 106 may be stored within a memory component of processor 120.

Display 108 may be any panel or device capable of rendering content for consumption by a user of device 100. In some embodiments, display 108 may be implemented as a flat panel display, such as an LCD, LED, OLED, or similar display technology. Other embodiments may employ different display technology, such as CRT, plasma, or another suitable technology now known or later developed. Display 108 may be equipped with one or more sensors for accepting input, such as a touch panel, which may be resistive, capacitive, optical, or another suitable technology, and/or may be pressure sensitive, such as able to detect applied forces. Display 108 may be physically integrated into device 100, as suggested in FIG. 1, or may be physically separate, with one or more of the other components depicted in FIG. 1 located apart from display 108. Display 108 may interface with the other components, such as sharing module 102 to receive content management, via supporting hardware and software, such as a graphics card or subsystem in conjunction with one or more display or graphics drivers.

Context engine 110, in the disclosed embodiments, is responsible for analyzing the various aspects that feed to sharing module 102 to facilitate selection of a configuration profile 106 and associated display content management. Context engine 110 is in communication with other modules in device 100, such as content/application 118, to select or assist sharing module 102 in selecting a suitable configuration profile 106. For example, where device 100 is occluding a second device, and is not running a specific application that is displaying to display 108, e.g. device 100 is displaying a device home screen or lock screen, then context engine 110 may determine that device 100's display 108 can be used to display occluded content from the second device. Conversely, if device 100 is displaying an image, then context engine 110 may determine that device 100 should not be used to display content from the second device. Context engine 110 may further receive location information from a device 100, such as from a GPS, IMU, or similar navigational module, which may help determine how best to manage content between the various devices 100a-n. In still other embodiments, context engine 110 may receive any other information from other aspects or components of device 100 that may be useful to determine how best to manage content across the devices 100a-n.

Following a given determination by context engine 110, context engine 110 communicates, in the illustrated embodiments, such a determination to sharing module 102, which in turn supplies the determination to external devices that are occluding or being occluded, for coordination with respective sharing modules 102 in each device 100a-n. In another example, context engine 110 may determine that display 108 is not on, e.g. the device is in a power-savings mode. If so, if sharing module 102 determines powering on the display is appropriate based upon a configuration profile 106, context engine 110 may either turn display 108 on, such as in coordination with processor 120, or may notify sharing module 102 which in turn coordinates powering display 108 on. Similarly, instructions to power display 108 on may come from an external device, which may be working in coordination with sharing module 102 and context engine 110 on device 100.

Sensing array 112, in embodiments, includes one or more sensing devices disposed upon, around, embedded within, or otherwise arrayed with display 108. The one or more sensing devices may comprise any suitable sensor capable of detecting the presence of an object disposed in proximity to the sensor. Examples of suitable sensing devices include magnetic sensors such as reed switches or Hall effect sensors, micro electro-mechanical sensors (MEMS) which may be capable of detecting force or pressure, capacitance sensors, RFID antennas and/or tags, impendence sensors that may change electrical characteristics in the presence of an external device, and/or cameras or other light sensitive sensors that may be able to sense changes in illumination imposed by an occluding device. These are only examples of possible sensors; any sensor or combination of sensors now known or later developed suitable for detecting the presence of an occluding device over an area may be employed.

Some embodiments may employ multiple types of sensors in combination to improve accuracy of detecting an occluding device. For example, where an occluding device is only partially overlapping a display 108, the occluding device may angle above the surface of display 108. The occluding device may only physically contact the edge of the bezel of display 108, but occlude a significant portion of the display with a gap of a few millimeters. Thus, force-sensitive sensors may only detect the presence of the occluding device where it actually contacts the edge of the bezel, but would not otherwise register the device angled above the display, with no actual contact. However, complementing force-sensitive sensors with proximity sensors such as magnetic sensors or RFID readers may allow the full shape of the occluded display portion to be detected, as a magnetic sensor may be able to detect the shape and orientation of the occluding device even when it is a few millimeters above the display 108 surface.

The one or more sensors of sensing array 112 may be disposed around the bezel of a display 108 (such as bezel 406 of display 404 depicted in FIG. 5), within the screen of display 108, or both. Some embodiments may vary the selection of sensor type depending upon the particular location of the sensor within display 108. For example, MEMS sensors, which may be substantially opaque in nature, may only be suitable for deployment within a bezel of display 108, as opposed to over the viewable portion of display 108. Conversely, capacitance sensors may be suitable for deployment over the viewable portion of display 108. Force-sensitive sensors may be able to be located beneath the display 108, e.g. beneath an OLED layer in the case of an OLED implementation of display 108.

In embodiments, sensing array 112 is configured to allow detection not only of the presence of a device occluding a display 108 of device 100, but also of its orientation and the area of display 108 occluded by the device. In some embodiments, sensing array 112 may only be disposed within the bezel of display 108. In other embodiments, sensing array 112 is disposed across both the bezel as well as the content display area of display 108, to effectively allow the entire exposed surface of display 108 to be utilized to detect the presence, orientation, and coverage of an occluding device. In still other embodiments, sensing array 112 is disposed only across the content display area of display 108, but not the bezel of display 108.

The positioning and number of sensors required may vary depending upon the specific requirements of a given embodiment. As a general principle, for a given type and size of sensor, the greater the accuracy required in detecting the orientation of an occluding device, the greater the number and density of sensors that may be required. For example, MEMS sensors, which may be fabricated to very small sizes, may be densely packed in a display 108 bezel, particularly where a high degree of precision in detecting the orientation of an occluding device is required. Other types of sensors, such as a camera array that is capable of relatively high resolution, may only require one or a few sensors to achieve a comparable accuracy level. In another example, a large-scale device, such as a table computer, may be able to achieve workable accuracy in detecting the position and orientation of an occluding device with a relatively lower density of sensors. In comparison, a smaller device, such as a tablet, may require greater precision in determining the shape of an occluded screen area to achieve acceptable results.

Sensing array 112 provides input to bezel position mapper 114, in embodiments. Bezel position mapper 114 determines the portions of the bezel that are occluded, and more particularly, the shape of the occluded portion, e.g. angle at which the occluding device cuts across the bezel. Angle 407, depicted in FIG. 5, is an example of this angle. As may be seen in FIG. 5, a device 412 that partially overlaps display 404 effectively occludes a screen portion defined by a right angle, with the edge of bezel 406 forming the hypotenuse. By sensing the angles 407 and positions at which a device cuts across a bezel 406 of a display 404 as well as the area of bezel 406 that is continuously occluded by the device, and either assuming or detecting that the occluding device is approximately rectangular in shape, the location and size of occluded area of display 404 can be calculated using well-known trigonometric techniques, e.g. law of sines or cosines combined with the Pythagorean theorem. With such techniques, it may be possible to accurately calculate the area of display 404 occluded by a device using only sensors in the bezel 406, without having to utilize additional sensors located in or under the portion of the display that shows content.

In some embodiments, each sensor in sensing array 112 on each device reports a unique identifier if activated, thus assisting the bezel position mapper 114 in determining which devices are in contact with each other, and/or the position of each device with respect to each other. A specific occluding device 100, identified by a unique ID as discussed above, can be associated with one or more sensors determined to be occluded by the device 100. In one example, if the occluding device 100 is moved proximate to the occluded device, such as by sliding, adjacent sensors are activated or deactivated, and sharing module 102 updates the particular active sensors that are associated with device 100's unique ID.

In scenarios where multiple devices occlude the same device, mutually activated sensors across a given pair of devices may, if of a suitable type, be compared for possible and impossible combinations, including by using activation methods to expose which device is which. For example, with respect to FIG. 5, if another device were laid across the screen of third device 414 overlapping a corner of third device 414 that is not overlapped by fourth device 416, third device 414 could use the sensors in sensing array 112 to disambiguate between the new device and fourth device 416. If each device implements magnetic sensors, third device 414 could pulse some of its magnetic sensors, such as in the case Hall sensors, to see which of the overlapping screens detects the pulse with its sensors, thus disambiguating between devices. The specific method of disambiguation may vary by sensor type, and such a feature may be an optional capability for some devices.

It will be appreciated that the foregoing techniques may not work for devices with a relatively large display 108, such as a table computer, where an occluding device may be placed upon the display 108 without overlapping any portion of the bezel. In such scenarios, sensing array 112 may need to extend to cover the content-displaying portion of display 108, as discussed above, to allow for devices placed upon display 108 that do not cross the display bezel. With reference to FIG. 5, devices 414 and 416 do not cross bezel 406, and so would need to be detected with sensors that are not limited to bezel 406. Where a device is so equipped, bezel position mapper 114 may be able to simply read the orientation and occluded area of an occluding device directly from sensing array 112, without the need for any mathematical extrapolation of the occluded area. In some embodiments, display 108 is equipped with pressure-sensitive surfaces that can detect the location of objects placed on the screen.

Authentication module 116, as mentioned above with reference to sharing module 102, handles ensuring that a device 100*a* is authorized to communicate with a device 100*b* (and/or other device 100*n*), in various embodiments. Authentication module 116, in some embodiments, may exchange a unique ID with each device 100*a*-100*n* with which it authenticates, to allow each respective device 100*a*-100*n* to be tracked when managing content. Thus, when more than one device 100*a*-100*n* is occluding another device, the appropriate content can be sent to each device 100*a*-100*n*. Authentication module 116 may further handle encrypting communications between devices 100*a* and 100*b*. Authentication module 116 may work in communication with processor 120, specifically, the communications aspect of processor 120, to facilitate communications between device 100*a* and 100*b*. Authentication module 116 may employ any suitable authentication technology appropriate for a given implementing embodiment. Such technologies may include a public/private key exchange, a token exchange, passcode, access control list, or other suitable authentication technique. In some embodiments, permissions 104 of sharing module 102 may include access control information useable by authentication module 116 to determine whether a device 100*n* may exchange data with a device 100*a*, and to what extent such data may be exchanged, as discussed above with respect to sharing module 102 and permissions 104.

In embodiments, content/application 118 may comprise any software that can execute on a given device 100. Such applications may or may not utilize display 108. As discussed above with respect to context engine 110, in some embodiments content/application 118 is used as an input to context engine 110 to help select a particular configuration profile 106 to employ in managing content across devices 100.

A given device 100 may implement some or all of the foregoing components. Some of these components, such as sharing module 102, context engine 110, bezel position mapper 114, authentication module 116, and content/application 118, may be implemented in hardware, software, or both. Some embodiments may use software to implement some modules, a combination of hardware and software for other modules, and/or hardware to implement still other modules. Where components are implemented at least partially in hardware, such hardware implementation may include one or more application-specific integrated circuits (ASICs), field-programmable gate arrays (FPGA), discrete components, or a combination of the foregoing. Software implementations may be executable on a purpose-built or general purpose computer, such as computer device 500 described below with respect to FIG. 6. Software may be implemented on a computer-readable medium, such as described below with respect to FIG. 7. In some embodiments, device 100 may comprise a display 108, sensing array 112, and a communications module, with additional functionality, such as processor 120 and associated storage, contained in a physically separate unit. The physically separate unit may drive multiple displays 108.

Further, while for ease of understanding, the technology of the present disclosure has been thus far described with peer-to-peer embodiments, where the devices 1-n 100a-100n all have the various components, such as, sharing modules 102 and so forth, to enable devices 1-n 100a-100n to communicate and coordinate with each other with respect the contents displayed on the screens of devices 1-n 100a-100n, the present disclosure is not so limited. In alternate embodiments, some or all of the coordination may be handled by one or more third parties that are not part of the overlapping displays 1-n 100a-110n, thereby allowing the displayed contents of one or more of overlapping devices 1-n 100a-100n to be nonetheless coordinated with the other overlapping devices 1-n 100a-100n, without the one or more overlapping devices 1-n 100a-100n having some or all of the earlier described elements to achieve the coordination. One such embodiments is described below with references to FIG. 2.

Figure 2:
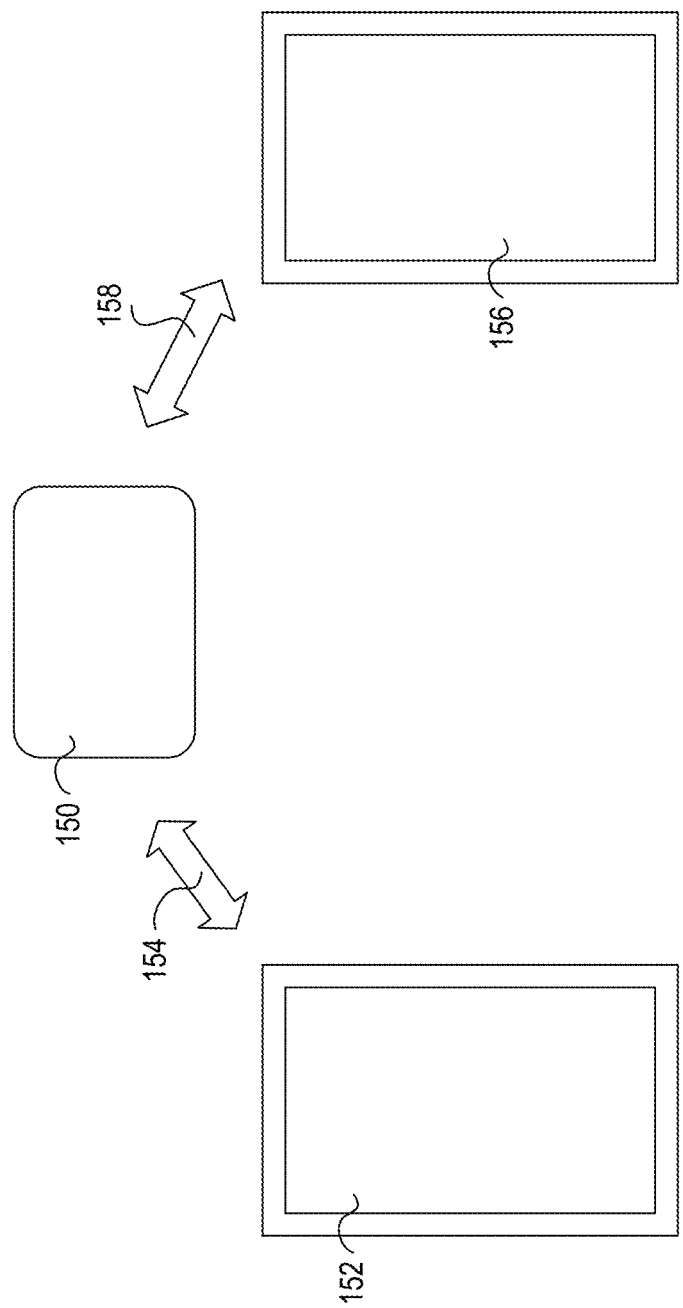
FIG. 2 is a diagram of an example system where a discrete server manages the content on overlapping displays, according to various embodiments.

FIG. 2 depicts a possible embodiment system where a first device 152 and second device 156 are communicatively coupled to a separate management server 150, via communications links 154 and 158, respectively. First device 152 and/or second device 156, in the illustrated embodiment, are self-contained, e.g. a smartphone, tablet, other computer device 500, or may be a display that relies upon an external source, such as management server 150 supply content. In some variations of the disclosed embodiment, management server 150 supplies content to both devices 152 and 156, coordinating content for both. In other variations, device 152 and/or 156 inform management server 150 of their respective contents, which management server 150 may then direct between the devices when one of device 152 or 156 occludes the other. In embodiments, each device 152 and 156 includes a sensing array 112 located at least in its bezel, and provides information from sensing array 112 to management server 150, allowing management server 150 to detect when one of the devices occludes the other.

In the embodiment of FIG. 2, management server 150 may implement one or more of the various components of a device 100a, such as sharing module 102 with permissions 104 and configuration profiles 106, context engine 110, bezel position mapper 114, authentication module 116, and/or content/application 118. Management server 150 may rely upon the configuration profiles 106 to coordinate content between each device 152 and 156. In some embodiments, devices 152 and 156 need not authenticate to each other, but instead may authenticate to management server 150. Management server 150, in some embodiments, is implemented as a computer device 500, and may or may not have its own display 108. In other embodiments, management server 150 is integrated with either device 152 or device 156. For example, where one of device 152 or device 156 is a table computer, the table computer may assume the role of both device 152 as well as management server 150, providing content to its own display as well as to device 156.

Communications links 154 and 158 may each or both be wired or wireless. For example, devices 152 and 156 may be touch-sensitive computer devices, such as tablets, that are configured to receive content from management server 150 wirelessly, using a protocol such as WiFi, Bluetooth, a cellular service such as LTE or 5G, or another suitable wireless protocol. In such an example, each device 152 and 156 includes a sensing array 112 to determine if one of the devices is at least partially occluding the other. Information from the sensing array 112 may be provided to management server 150 either directly or via a bezel mapper or other processing, which management server 150 may then use, based upon stored configuration profiles 104, to coordinate the content across both devices 152 and 156. It should be understood that although two devices are depicted, management server 150 may be connected to and manage the content for an arbitrary number of devices, subject only to management server 150's capacity limits.

Figure 3:
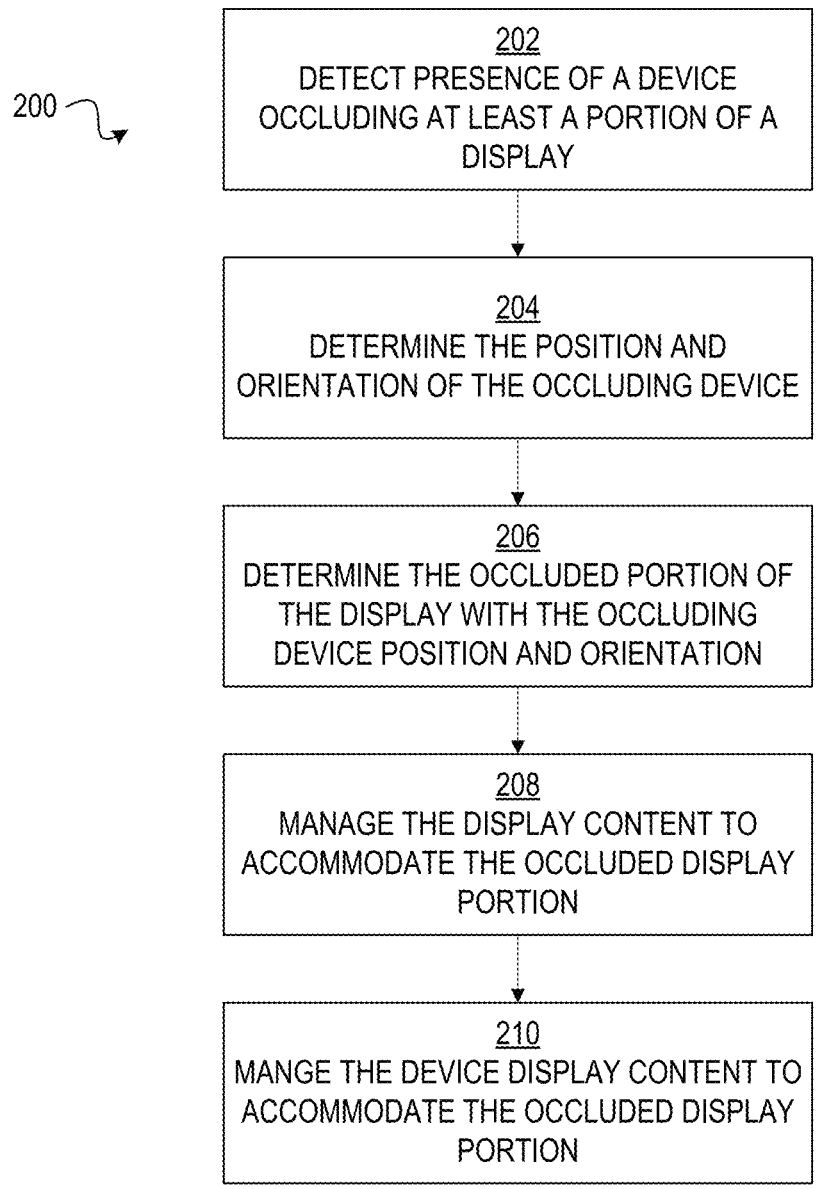
FIG. 3 is a flowchart of a possible method for managing content across two or more overlapping displays, according to various embodiments.

Turning to FIG. 3, an example method 200 of operations for managing content across overlapping devices is depicted, according to some embodiments. The various operations of method 200 are carried out in whole or in part by one or more of devices 100a-100n, devices 152 and 156, or the like, as described above. Beginning in operation 202, an implementing device first detects the presence of a device occluding at least a portion of a display that is in communication with the implementing device. Such detection may be carried out using a sensing array 112 in conjunction with bezel position mapper 114, as described above with respect to FIG. 1. In some embodiments, operation 202, as the start of method 200, may be carried out automatically by an occluded device upon detection of an device placed in an occluding position, without additional interaction by a user with either device necessary.

In operation 204, the sensing array 112 and bezel position mapper 114 allows determining the position and orientation of the occluding device. From this information, in operation 206 the portion of the display that is occluded can be determined, either by calculation or direct computation. In some embodiments, the occluding device may supply information to the occluded device (or, depending on the embodiment, a management server 150) that includes information about its actual footprint. For example, some devices may have a taper or curve around its edges that may adversely impact accurately determining the occluded area, as portions of the device may not contact the display yet still occlude a portion. In some embodiments this may be compensated by use of sensors that can detect a device not in contact with the occluded display, as discussed above. In other embodiments, the occluding device can transmit information, such as the amount of the occluding device that does not contact the occluded screen and/or the occluding device's shape, which the occluded device can use to accurately determine the actual portion of the screen that is occluded.

Once the occluded display portion is determined, in operations 208 and 210 the display content of either the occluded device (in operation 208), the occluding device (in operation 210), or both, are managed to accommodate the occluded display portion. The ways in which the content can be managed may be established by the configuration profiles 106, which may be located in either the occluded device, the occluding device, or both. The configuration profiles 106 may be used by each respective device to manage content on each device's respective display 108 (either as part of device 100 or connected to device 100). Examples of possible ways to accommodate the occluded portion will be described herein with respect to FIG. 5.

In some embodiments, content management includes timing the presentation and update of content on the occluded device's display 108 to accommodate lag or latency that may be introduced in the transmission of content to the occluding device's display 108, particularly when the occluding device's display is to act as a pass-through or window to the occluded device's display, as will be discussed herein with reference to FIG. 5. By timing the presentation and update of content to account for this latency, the updating of content on the occluding display can be effectively timed with updated content on the occluded display to present an essentially seamless appearance, as if the occluding display is a virtual window.

A device or system implementing such an embodiment of method 200 may either time the latency between transmission of content and its subsequent display on the occluding device's display, or may receive a measurement of the latency from the occluding device, based on, for example, a timestamp in a packet or other data transmission placed by the occluded device upon transmission to the occluding device. In the second technique, the occluding device can compare the timestamp in the transmission with its internal clock upon the display of received content, and supply the time differential to the occluded device for calculating latency. In some embodiments, latency may also include any delay imposed by any necessary scaling of the content to accommodate differences in display resolution between the occluded and occluding devices. Still further, differences in computing or processing power between the occluded and occluding devices may impose further latencies, where content must be processed prior to display.

Additional lag or latency may be imposed if the occluding display is moved or panned across the occluded display, with a lag in the updated content on the occluding display imposed by both streaming between the occluded and occluding devices, as well as any necessary processing, such as the occluding device continuously recalculating the position and orientation of the occluded device, and any content scaling that may be required. This latency may be addressed, in embodiments, by a caching strategy, such as where the occluded device transmits a larger than necessary portion of the content to the occluding device, which can greatly reduce the amount of data that may need to be transmitted when if the occluding device moves. Additional or alternative embodiments may incorporate sensors in the occluding device that measure device movement, such as an accelerometer and/or gyroscope, to enable the occluding device to autonomously update its content from the cached content on the basis of detected motion, effectively reducing or eliminating any noticeable latency. Other embodiments may employ different strategies to help synchronize content between occluded and occluding devices so as to minimize any latency.

Figure 4:
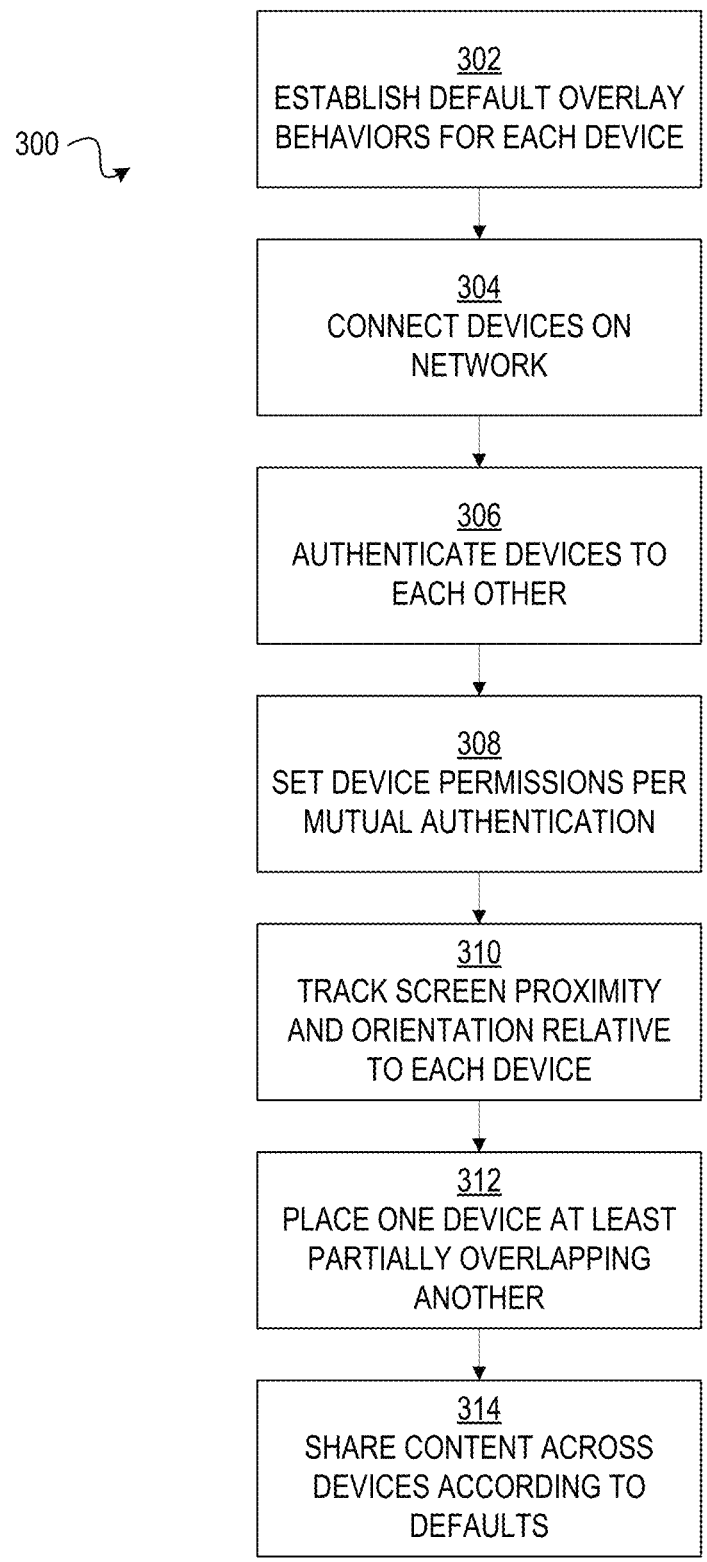
FIG. 4 is a flowchart of a possible method for authenticating between two or more devices with overlapping displays and managing content, according to various embodiments.

In FIG. 4, another example method 300 for managing content between devices is depicted. Method 300 is implemented, in whole or in part, by devices 100a-n as depicted in FIG. 1, devices 152, 156, or the like, and management server 150 in FIG. 2. While method 200 focused on operations following occlusion detection, method 300 includes operations establishing connections between devices 100a-n, or between devices 152/156 and management server 150, which are then prepared to manage content in the event of occlusion detection. In operation 302, the default overlay behaviors for each device are established. As described above, these default behaviors may be captured by configuration profiles 106. Configuration profiles 106 may be predetermined, or may be dynamically determined as devices 100a-n connect to each other.

In operation 304, the various devices executing method 300 may connect over a network, and then authenticate to each other in operation 306. The devices may connect over a wired or wireless network, including WiFi, Bluetooth, cellular networks, or another suitable technology. Authentication may be handled by authentication module 116, as described above.

Following authentication, in operation 308 the devices set device permissions per a mutual authentication process. The permissions may be stored as permissions 104, and either be used to set device permissions in the mutual authentication process, or may be set as a result of the authentication process.

In operation 310, one or more of the connected devices track screen proximity and orientation relative to each device. Such tracking and determining of orientation may be performed with input from each device's sensing array 112 and bezel position mapper 114, which may detect the presence of a potentially occluding device. A device is placed atop another device at least partially overlapping it, thereby occluding at least a portion of the overlapped device's screen, in operation 312. Finally, in operation 314, content may be shared between the overlapping and overlapped devices according to the default overlay behaviors established in operation 302.

It may be realized that operations 310, 312, and 314 approximately encompass the operations of method 200. Method 200, then, may be thought of as the particular operations carried out for operations 310, 312, and 314 of method 300.

Various arrangements of devices and screen content management strategies are depicted in FIG. 5. FIG. 5 includes a first device 402, which is depicted as a table computer or similar large display. First device 402 includes, as discussed above, a display 404 for displaying content, which may be an implementation of display 108. Surrounding display 404 is a bezel 406. Display 404 and bezel 406 include a sensing array 112 to detect the presence of potentially occluding devices. These potentially occluding devices are depicted as second device 412, a portion of which is occluding first device 402, third device 414, the entirety of which is occluding first device 402, and fourth device 416, which is occluding a portion of both first device 402 and third device 414. It will be recognized that while first, second, and third devices each may require a sensing array 112 to detect occlusion, fourth device 416 may not require a sensing array 112 of its own (or such sensing array 112 may not be required) as it is occluding screens below it, but is not otherwise occluded.

A first possible configuration for display management is depicted between first device 402 and second device 412. Content 410 displayed on first device 402 is resized, scaled, or otherwise moved to accommodate the positioning of second device 412, which itself contains different content. This results in a portion 408 that has no content, where second device 412 occludes display 404, thereby allowing the full content of first device 402 to be viewed without being covered by second device 412.

As a variation embodiment of the first possible configuration, content on the first device 402 can extend onto second device 412, effectively expanding the display area of first device 402 to accommodate a greater amount of content. Such content may need to be scaled where the pixel density of each display differs, as will be discussed further below. In such a configuration, second device 412 may further be configured to effectively act as a second or extended display portion of first device 402, when second device 412 no longer occludes any portion of display 404.

A second possible configuration for display management is depicted between first device 402 and third device 414. Here, the entirety of third device 414 occludes a portion of display 404. Rather than scaling content on display 404, the occluded content is transmitted to, and displayed upon, third device 414. Third device 414 effectively becomes a pass-through window, displaying the occluded content of display 404. In some embodiments, methods 200 and 300 may be repeated iteratively, so that as third device 414 is moved across display 404 its displayed content continually changes to reflect the newly occluded portion of display 404.

In some embodiments, the resolution and/or pixel pitch between display 404 and a display of third device 414 may differ, e.g. one device may have a pixel pitch better than 300 pixels per inch (ppi), which another may have less than 100 ppi. In such embodiments, either display 404 or third device 414 may need to scale or otherwise resize the displayed content to match the physical size of displayed content between display 404 and third device 414. In some examples, third device 414 may resample content up or down to approximate the pixel pitch of the display 404. In other examples, first device 402 may resample the content prior to providing to third device 414, using information from third device 414 about the pixel pitch of its associated display.

In some embodiments, other display aspects between the various displays of first device 402, second device 412, third device 414, and/or fourth device 416 may vary, such as color space (e.g., sRGB, Adobe RGB), tint, saturation, contrast, brightness, color temperature, gamma, and other display quality adjustments. In addition or alternate to resolution scaling or adjustment, one or more of these other aspects may be synchronized between devices. In some embodiments, device display aspects can be conveyed, such as along with resolution and content information, between devices in a display profile, which includes settings for one or more of the foregoing aspects. Setting values may be made with reference to a commonly accepted standard for measurement and calibration of display aspects, as is known in the art.

For a first example, where third device 414 occludes display 404, first device 402 transmits display aspect settings to third device 414 along with content and resolution information. Third device 414 then utilizes the transmitted aspects to adjust its display parameters to essentially match the display aspects of display 404. In a second example, third device 414 transmits its display aspect settings to first device 402 as part of information to first device 402 about third device 414's footprint (as discussed above). First device 402 may then provide third device 414 information how its display aspects differ or, alternatively, may adjust the content data prior to sending to third device 414 to account for the differences in display aspects, so that the content displayed on third device 414 approximately matches the content on display 404 without requiring third device 414 to adjust the content. In a third possible example, third device 414, if equipped with a camera and/or other light sensor(s) that faces any surface upon which third device 414 is set (as is commonly found in devices such as smartphones and tablets), may use the camera or light sensor to directly measure display aspects from occluded display 404. With these measurements, third device 414 can then adjust content received from first device 402 to account for measured display differences.

A third possible configuration for display management, similar to the second possible configuration, is depicted between third device 414 and fourth device 416. Fourth device 416 is partially positioned atop third device 414, similar to the arrangement between first device 402 and second device 412. However, fourth device 416 is configured to act as a pass-through window of the content on third device 414, similar to how third device 414 passes through the content of display 404. Fourth device 416 is also acting as a pass-through window of the content of display 404 directly beneath it. Depending on the particular embodiment, fourth device 416 may receive content from both first device 402 (the content that it directly occludes) as well as third device 414 (the content it directly occludes on third device 414). In still other embodiments, first device 402 may recognize the configuration of third device 414 and fourth device 416, and manage both devices simultaneously to act as pass-through windows, receiving positional and orientation information from both its own sensing array 112 and a sensing array 112 disposed within third device 414. First device 402 may further use such information, as depicted in FIG. 5, to accommodate the bezel around third device 414. First device 402 may recognize it as a non-display area, and pass through the content on display 404 that is otherwise occluded by the bezel of third device 414; thus, fourth device 416 does not show the bezel of third device 414.

These are just example configurations; other configurations may be possible in other embodiments, particularly where the configuration of a given display may vary. In another possible example, an occluding device with a slim or virtually no bezel may be used to enhance the content of the occluded device. The occluded device may be smaller than the occluding device, where the occluding device completely covers the occluded device, and thus allows viewing either expanded content from the occluded device, or allows content to be viewed from the occluded device without the interference of a bezel or other distracting display artifact. Scaling may be employed on a larger device to effectively magnify the content on a smaller occluded device, or even to magnify a portion of a larger occluded display (effectively turning an occluding device into a virtual or electronic magnifying glass), also potentially enhancing the viewing of the occluded content. Thus, the disclosed embodiments may allow the creation of flexible display configurations, particularly by modifying the various configuration profiles 106.

Figure 6:
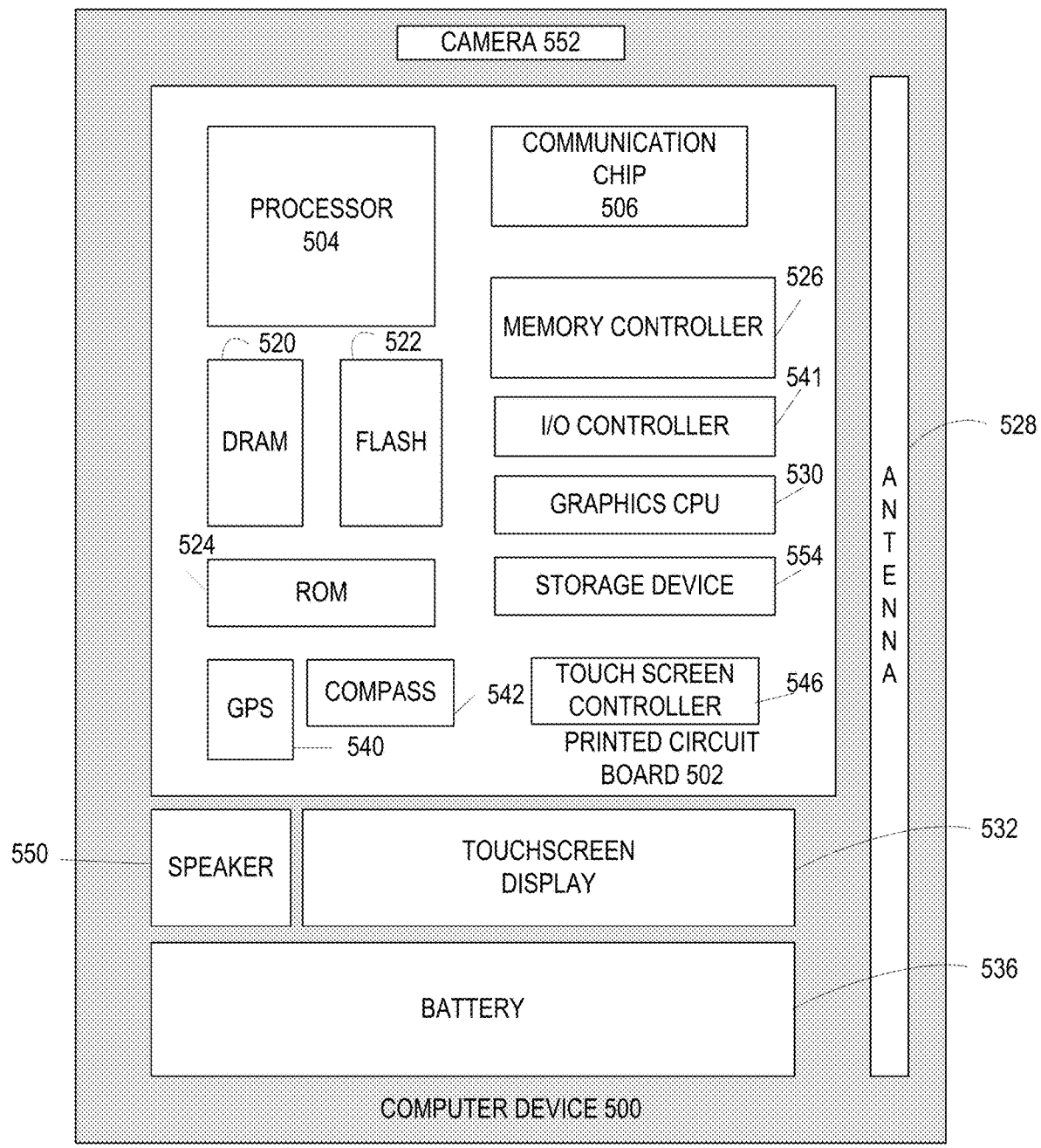
FIG. 6 is a block diagram of an example computer that can be used to implement some or all of the components of the system or methods disclosed herein, according to various embodiments.

FIG. 6 illustrates an example computer device 500 that may employ the apparatuses and/or methods described herein (e.g., devices 100*a*-100*n* and/or components thereof, such as sharing module 102, display 108, context engine 110, authentication module 116, content/application 118, processing/comms/memory 120, as well as devices 152 and 156 or server 150), in accordance with various embodiments. As shown, computer device 500 includes a number of components, such as one or more processor(s) 504 (one shown) and at least one communication chip 506. In various embodiments, the one or more processor(s) 504 each may include one or more processor cores. In various embodiments, the one or more processor(s) 504 may include hardware accelerators to complement the one or more processor cores. In various embodiments, the at least one communication chip 506 may be physically and electrically coupled to the one or more processor(s) 504. In further implementations, the communication chip 506 may be part of the one or more processor(s) 504. In various embodiments, computer device 500 may include printed circuit board (PCB) 502. For these embodiments, the one or more processor(s) 504 and communication chip 506 may be disposed thereon. In alternate embodiments, the various components may be coupled without the employment of PCB 502.

Depending on its applications, computer device 500 further includes other components that may be physically and electrically coupled to the PCB 502. These other components may include, but are not limited to, memory controller 526, volatile memory (e.g., dynamic random access memory (DRAM) 520), non-volatile memory such as read only memory (ROM) 524, flash memory 522, storage device 554 (e.g., a hard-disk drive (HDD)), an I/O controller 541, a digital signal processor (not shown), a crypto processor (not shown), a graphics processor 530, one or more antennae 528, a display (not shown), a touch screen display 532, a touch screen controller 546, a battery 536, an audio codec (not shown), a video codec (not shown), a global positioning system (GPS) device 540, a compass 542, an accelerometer (not shown), a gyroscope (not shown), a speaker 550, a camera 552, and a mass storage device (such as hard disk drive, a solid state drive, compact disk (CD), digital versatile disk (DVD)) (not shown), and so forth.

In some embodiments, the one or more processor(s) 504, flash memory 522, and/or storage device 554 may include associated firmware (not shown) storing programming instructions configured to enable computer device 500, in response to execution of the programming instructions by one or more processor(s) 504, to practice all or selected aspects of the occluding devices content display coordination methods described herein. In various embodiments, these aspects may additionally or alternatively be implemented using hardware separate from the one or more processor(s) 504, flash memory 522, or storage device 554.

The communication chips 506 enable wired and/or wireless communications for the transfer of data to and from the computer device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 500 may include a plurality of communication chips 506. For instance, a first communication chip 506 may be dedicated to shorter range wireless communications such as Wi-Fi and Bluetooth, and a second communication chip 506 may be dedicated to longer range wireless communications such as GPS, EDGE, GPRS, CDMA, WiMAX, LTE, Ev-DO, and others.

Communications chips 506 may be used to implement a transmitter, receiver, or transceiver components of device 100, such as part of or in communication with processing/comms/memory 120.

In various implementations, the computer device 500 may be a laptop, a netbook, a notebook, an ultrabook, a smartphone, a computer tablet, a personal digital assistant (PDA), a desktop computer, or a server. In further implementations, the computer device 500 may be any other electronic device that processes data.

Figure 7:
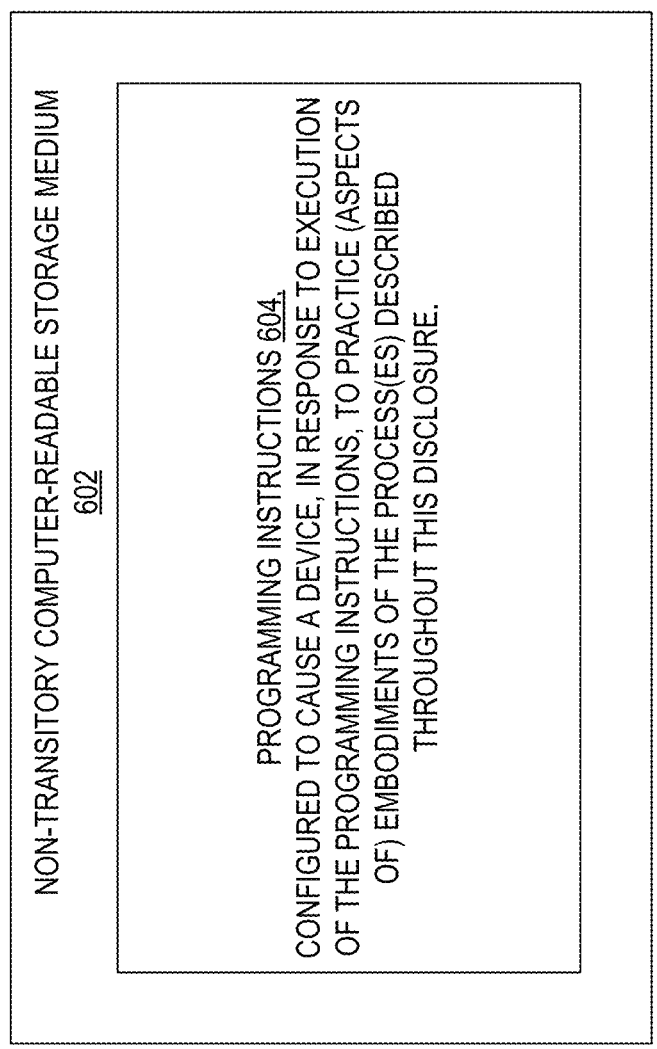
FIG. 7 is a block diagram of a computer-readable storage medium that can be used to implement some of the components of the system or methods disclosed herein, according to various embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 7 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 602 may include a number of programming instructions 604. Programming instructions 604 may be configured to enable a device, e.g., computer 500, in response to execution of the programming instructions, to implement (aspects of) sharing module 102, context engine 110, bezel position mapper 114, authentication module 116, and/or content/application 118 of device 100, or operations of device 152/156 or server 150. In alternate embodiments, programming instructions 604 may be disposed on multiple computer-readable non-transitory storage media 602 instead. In still other embodiments, programming instructions 604 may be disposed on computer-readable transitory storage media 602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

EXAMPLES

The following examples pertain to further embodiments.

Example 1 is a non-transitory computer readable medium (CRM) containing instructions executable by a processor of an apparatus, that when executed cause the apparatus to receive information from one or more sensors disposed at least in a bezel of a display of a first device, and determine a position and orientation of a second device relative to the first device display based on the information received from the one or more sensors; and manage content displayed on the first device display and on a display of the second device where the position mapper determines, based on the position and orientation of the second device, that a portion of the first device display is occluded.

Example 2 includes the subject matter of example 1, or some other example herein, wherein the first device and the second device are each remotely disposed from the apparatus, and wherein the second device is proximally disposed with the first device.

Example 3 includes the subject matter of example 1, or some other example herein, wherein the apparatus comprises the first device.

Example 4 includes the subject matter of example 1, or some other example herein, wherein the apparatus comprises the second device.

Example 5 includes the subject matter of any of examples 1-4, or some other example herein, wherein the apparatus is caused to cause the second device display to display content from the occluded portion of the first device display.

Example 6 includes the subject matter of any of examples 1-4, or some other example herein, wherein the apparatus is caused to cause content on the first device display to be scaled to avoid the occluded portion of the first device display.

Example 7 includes the subject matter of any of examples 1-6, or some other example herein, wherein the apparatus is caused to communicate with the second device, and is to further determine the area of occluded portion of the first device display with information about one or more second device dimensions received from the second device.

Example 8 includes the subject matter of any of examples 1-7, wherein the apparatus is caused to manage content displayed on the first device display, the second device display, or both, is based at least in part on a context of the content.

Example 9 is a method for computing, comprising detecting, by a component of a first device, the presence of a second device occluding at least a portion of a display of the first device; determining, by the component of the first device, the position and orientation of the second device relative to the display using one or more sensors disposed on the display; determining, by the component of the first device, using the position and orientation of the device, the portion of the display that is occluded by the second device; and managing, by the component of the first device, content of the display to accommodate the occluded portion of the display, based at least in part on a context of the content.

Example 10 includes the subject matter of example 9, or some other example herein, further comprising transmitting, by the component of the first device, to the second device for display on a second device display, content contained in the occluded portion of the first device display.

Example 11 includes the subject matter of example 10, or some other example herein, further comprising scaling, by the component of the first device, the content for display on the second device display to match the scale of the content contained in the occluded portion of the first device display.

Example 12 includes the subject matter of example 9, or some other example herein, wherein managing the content comprises resizing content on the display to avoid the occluded portion.

Example 13 includes the subject matter of any of examples 9-12, or some other example herein, wherein using one or more sensors disposed on the display comprises using one or more sensors disposed in a bezel of the display.

Example 14 includes the subject matter of any of examples 9-13, or some other example herein, further comprising receiving, by a component of the first device, information about the second device's size; and using the information about the second device's size to determine a portion of the display that is occluded by the first device and not detected by the one or more sensors.

Example 15 includes the subject matter of any of examples 9-14, or some other example herein, further comprising associating a unique identifier with each of the one or more sensors, and determining the position and orientation of the second device includes determining the position and orientation of the second device based upon the unique identifier associated with each of the one or more sensors when each sensor is activated.

Example 16 is a non-transitory computer readable medium (CRM) containing instructions executable by a processor of a first device, that when executed cause the first device to authenticate with a second device in response to the first device being placed at least partially on top of a display of the second device; and provide the second device with at least one physical dimension of the first device, the at least one physical dimension useful for determining an area of the second device display that is occluded by the first device.

Example 17 includes the subject matter of example 16, or some other example herein, wherein the first device is caused to modify the content of a display connected to the first device in response to receiving display management data from the second device.

Example 18 includes the subject matter of example 17, or some other example herein, wherein the display management data from the second device comprises occluded content present within the area of the second device display that is occluded by the first device, and the instructions are further to cause the first device to display the occluded content.

Example 19 includes the subject matter of any of examples 16-18, or some other example herein, wherein the first device is caused to provide context information to the second device.

Example 20 includes the subject matter of any of example 16-19, or some other example herein, wherein the first device is caused to provide the second device with a unique ID identifying the first device.

Example 21 is an apparatus for computing, comprising means to detect the occlusion of at least a portion of a display of the apparatus by another apparatus with a display; and means to manage content on the displays of the two apparatuses to accommodate the occluded portion of the display of the apparatus, based upon a context of the content, wherein the means to detect is in communication with one or more sensors disposed in the apparatus that can sense the location and orientation of the other apparatus when in proximity to the apparatus.

Example 22 includes the subject matter of example 21, or some other example herein, wherein the means to manage content is to cause the display of the other apparatus to display content from the occluded portion of the display of the apparatus.

Example 23 includes the subject matter of example 21 or 22, or some other example herein, wherein the one or more sensors each comprise a MEMS sensor, a magnetic sensor, an RFID tag detector, or a camera.

Example 24 includes the subject matter of example 21 or 22, or some other example herein, wherein the means to manage content is to cause content on the display to be scaled to avoid the occluded portion of the display.

Example 25 includes the subject matter of any of examples 21-24, or some other example herein, wherein the apparatus is to determine the area of the occluded portion of the display with information about one or more dimensions of the other apparatus, received from the other apparatus.

What is claimed is:

1. A non-transitory computer readable medium (CRM) containing instructions executable by a processor of an apparatus, that when executed cause the apparatus to:
   determine a position and orientation of a second device relative to a first device display based on sensor information received from one or more sensors of the first device;
   select a first device configuration profile, a second device configuration profile, or both, the first device configuration profile and second device configuration profile indicating a possible display behavior of the first device and second device, respectively; and
   manage content displayed on the first device display and on a display of the second device where a position mapper determines, based on the position and orientation of the second device, that a portion of the first device display is occluded,
   wherein the content displayed on the first device display, on the second device display, or both is managed based at least in part upon on a context of the content, the context including a current content of the first device display, a current content of the second device display, and an amount of the portion of the first device display that is occluded, and
   wherein the content displayed on the first device display, on the second device display, or both is further managed based on permissions for controlling access to the first device display, the second device display, or both, and is managed based on the selected first device configuration profile, second device configuration profile, or both.

2. The CRM of claim 1, wherein the first device and the second device are each remotely disposed from the apparatus, and wherein the second device is proximally disposed with the first device.

3. The CRM of claim 1, wherein the apparatus comprises the first device.

4. The CRM of claim 1, wherein the apparatus is caused to cause the second device display to display content from the occluded portion of the first device display.

5. The CRM of claim 1, wherein the apparatus is caused to cause content on the first device display to be scaled to avoid the occluded portion of the first device display.

6. The CRM of claim 1, wherein the apparatus is caused to communicate with the second device, and is to further determine an area of the occluded portion of the first device display with information about one or more second device dimensions received from the second device.

7. A method for computing, comprising:
  detecting, by a first device, the presence of a second device occluding at least a portion of a display of the first device;
  determining, by the first device, a position and orientation of the second device relative to the first device display using one or more sensors disposed on the display;
  determining, by the first device, using the position and orientation of the second device, the portion of the first device display that is occluded by the second device;
  selecting, by the first device, a first device configuration profile, a second device configuration profile, or both, the first device configuration profile and second device configuration profile indicating a possible display behavior of the first device and second device, respectively; and
  managing, by the first device, content of the first device display to accommodate the occluded portion of the first device display, based at least in part on a context of the content, the context including a current content of the first device display, a current content of a second device display, and an amount of the portion of the first device display that is occluded, and
  wherein the content displayed on the first device display is further managed based on permissions for controlling access by the second device to the first device display, and is managed based on the selected first device configuration profile, second device configuration profile, or both.

8. The method of claim 7, further comprising transmitting, by the first device, to the second device for display on a second device display, content contained in the occluded portion of the first device display.

9. The method of claim 8, further comprising scaling, by the first device, the content for displaying on the second device display to match the scale of the content contained in the occluded portion of the first device display.

10. The method of claim 7, wherein managing the content comprises resizing content on the first device display to avoid the occluded portion.

11. The method of claim 7, wherein managing the content comprises adjusting aspects of the second device display to substantially match aspects of the first device display, the aspects including at least one of color space, tint, saturation, contrast, brightness, color temperature, and gamma.

12. The method of claim 7, wherein using one or more sensors disposed on the display comprises using one or more sensors disposed in a bezel of the display.

13. The method of claim 7, further comprising:
  receiving, by the first device, information about the second device's size; and
  using the information about the second device's size to determine a portion of the display that is occluded by the first device and not detected by the one or more sensors.

14. The method of claim 7, further comprising associating a unique identifier with each of the one or more sensors, and determining the position and orientation of the second device includes determining the position and orientation of the second device based upon the unique identifier associated with each of the one or more sensors when each sensor is activated.

15. A non-transitory computer readable medium (CRM) containing instructions executable by a processor of a first device, that when executed cause the first device to:
  authenticate with a second device in response to the first device being placed at least partially on top of a display of the second device;
  provide the second device with at least one physical dimension of the first device, the at least one physical dimension useful for determining an area of the second device display that is occluded by the first device;
  provide the second device with a first device configuration profile, the first device configuration profile indicating a possible display behavior of the first device; and
  receive, from the second device, display management data, the display management data based at least in part upon on a context information, the context information including a current content of a first device display, a current content of the second device display, and an amount of the portion of the second device display that is occluded, and
  wherein the content displayed on the first device display in response to receipt of the display management data is further based on permissions for controlling access by the second device to the first device display, and is managed based on the first device configuration profile, a second device configuration profile, or both, the second device configuration profile indicating a possible display behavior of the second device.

16. The CRM of claim 15, wherein the instructions are to further cause the first device to modify the content of a display connected to the first device in response to receiving the display management data from the second device.

17. The CRM of claim 16, wherein the display management data from the second device comprises occluded content present within the area of the second device display that is occluded by the first device, and the instructions are further to cause the first device to display the occluded content.

18. The CRM of claim 15, wherein the instructions are to further cause the first device to provide the context information to the second device.

19. The CRM of claim 15, wherein the instructions are to further cause the first device to provide the second device with a unique ID identifying the first device.

20. An apparatus for computing, comprising:
  means to detect the occlusion of at least a portion of a first display of the apparatus by an occluding apparatus with a second display; and
  means to manage content on the first and second displays to accommodate the occluded portion of the first display, based upon a context of the content, the context including a current content of the first display, a current content of the second display, and an amount of the portion of the first display that is occluded,
  wherein the means to detect is in communication with one or more sensors disposed in the apparatus that can sense a location and orientation of the occluding apparatus when in proximity to the apparatus, and
  wherein the content displayed on the first display, on the second display, or both is further managed based on permissions for controlling access to the first device display, the second device display, or both, and
  wherein the content is managed based on either a first device configuration profile, a second device configuration profile, or both, the first device configuration profile and second device configuration profile indicating a possible display behavior of the first device and second device, respectively.

21. The apparatus of claim 20, wherein the means to manage content is to cause the second display to display content from the occluded portion of the first display.

22. The apparatus of claim 20, wherein the one or more sensors each comprise a MEMS sensor, a magnetic sensor, an RFID tag detector, or a camera.

23. The apparatus of claim 20, wherein the means to manage content is to cause content on the first display to be scaled to avoid the occluded portion of the first display.

24. The apparatus of claim 20, wherein the apparatus is to determine the area of the occluded portion of the first display with information about one or more dimensions of the occluding apparatus, received from the occluding apparatus.

* * * * *